Aug. 18, 1953

F. P. BOHNE 2,649,252

PAPER MEASURING AND DELIVERY MECHANISM
FOR COIL WINDING MACHINES

Filed May 31, 1950

INVENTOR
F. P. BOHNE
BY
ATTORNEY

Aug. 18, 1953

F. P. BOHNE 2,649,252

PAPER MEASURING AND DELIVERY MECHANISM
FOR COIL WINDING MACHINES

Filed May 31, 1950

INVENTOR
F. P. BOHNE
BY
ATTORNEY

Aug. 18, 1953  F. P. BOHNE  2,649,252
PAPER MEASURING AND DELIVERY MECHANISM
FOR COIL WINDING MACHINES

Filed May 31, 1950 6 Sheets-Sheet 6

INVENTOR
F. P. BOHNE
BY
*W. C. Parnell*
ATTORNEY

Patented Aug. 18, 1953

2,649,252

UNITED STATES PATENT OFFICE 2,649,252

PAPER MEASURING AND DELIVERY MECHANISM FOR COIL WINDING MACHINES

Frederick P. Bohne, Salem Depot, N. H., assignor to Western Electric Company, Incorporated, New York, N. Y., a corporation of New York Application May 31, 1950, Serial No. 165,342

3 Claims. (Cl. 242—10)

This invention relates to machines for winding electrical coils and more particularly to improvements in winding machines of the type shown in Patent 2,029,577 to Arthur W. Le Boeuf.

The particular type of universal coil winding machine shown in the Le Boeuf patent includes a rotatable mandrel upon which a plurality of coils are to be wound simultaneously from insulated wires distributed uniformly to form layers of given numbers of convolutions, the layers being separated from each other by paper strips of lengths which vary as the coils build up with the added layers of wire convolutions. The machine of this patent was designed to wind coils of a given minimum size or larger coils depending upon the size of the mandrel employed and also the gage of the wire for each coil. The machine includes mechanisms to carry out the winding operation, including the initial advancement of the paper strip, the gripping of the leading end of the strip on a delivery shelf which has to be spaced a given distance from a cutting unit to provide room for a measuring bar to form loops of varying sizes in the strip between the delivery shelf and the cutting unit. The minimum length of strip which can be measured and delivered by mechanisms of this type is longer than required for many of the very small coils now required in telephony and the use of such unnecessarily long lengths builds up the diameter of the coils and makes their resistance excessive.

The principal objects of this invention are to overcome this limitation of such coil winding machines and to measure and deliver very short strips of insulation by a simple and efficient mechanism which may be readily incorporated in the standard machine.

With these and other objects in view, the invention comprises a mechanism in a machine for winding coils having means to rotate a mandrel upon which layers of predetermined numbers of convolutions of wire may be successively wound, the mechanism including a delivery shelf supported for movement from a receiving position, closely adjacent the cutting unit, and a feeding position adjacent the mandrel. This is essential in removing lengths of the strip of insulating material or paper which are sufficiently short. Also the invention includes a positive clamp for the leading end of the strip on the delivery shelf whereby the shelf during the first part of its movement toward the mandrel will pull a measured length of the strip relative to the cutting unit.

Although the measuring bar of the machine has been removed, the mechanism for actuating it now performs two functions, the first opening and effecting closing the clamping element on the delivery shelf at the receiving position, and the second in imparting the first or measuring movement to the delivery shelf toward the mandrel to pull the measured length of the strip relative to the cutting unit. Another feature of the invention is the cam means to open the clamping element at the feeding position.

Other objects and advantages will be apparent from the following detailed description when considered in conjunction with the accompanying drawings, wherein Fig. 1 is a fragmentary vertical sectional view illustrating the position of the delivery shelf during feeding of the paper strip thereto;

Figure 1:
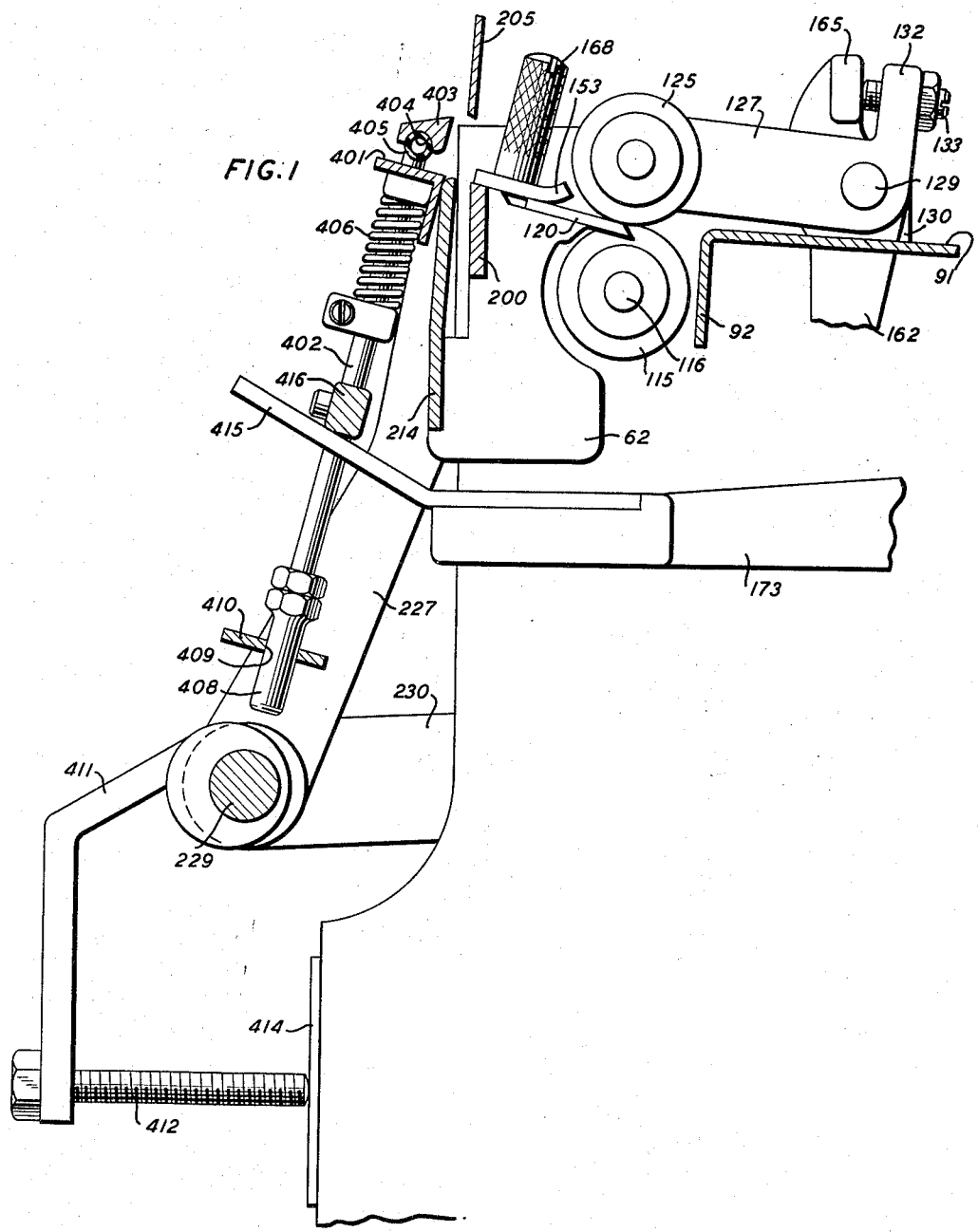

In the description of the machine all reference numerals below 400 will identify the parts of the machine as disclosed in the Le Boeuf patent, the reference numerals for these parts of the machine being identical with those of the patent.

A mandrel 400 of the desired cross-sectional contour and size is supported in the conventional manner for rotation about its axis for the winding of a selected number of coils simultaneously thereon. As a rule, the mandrel is completely surrounded with a strip of insulating material, such as paper, prior to the securing of the ends of the wires W to the mandrel preparatory to starting the winding operation. In the present embodiment of the invention, it is desirable to wind small coils, that is, coils smaller than could be produced by the structure disclosed in the Le Boeuf patent. Therefore the mandrel 400 may be smaller in size. Layers of the wires containing a given number of convolutions are to be distributed in the conventional manner on the initial paper core placed on the mandrel, after which the distributing arm (not shown) reverses in its travel to form successive layers of wires which must be separated from each other by insulating material such as paper strips of lengths sufficient to completely surround the previous layer of wires and possibly to overlap a distance necessary to assure satisfactory insulation between the layers. This requires accurately measured lengths of the insulating material and, in the present embodiment of the invention, much shorter lengths than could be produced by the initial machine.

A strip S (Fig. 3) of the insulating material is received from a supply (not shown), passes beneath a tensioning means (not shown), travels upwardly and around a bar 60 and forwardly over a table 91 where its leading end is positioned between the feed rolls 115 and 125. An eccentric element 111 pivoted at 110 rests upon the strip adjacent the bar 60 to permit free forward movement of the strip and to hold the strip against possible rearward movement. The feed rolls 115 and 125 are driven at given intervals of time during the operation of the machine to advance the leading end of the strip on to the delivery shelf 401, as shown in Fig. 1, between the blades 120 and 153 and through the shearing unit which is composed of a stationary blade 200 and a movable blade 205. The feed roll 125 is supported by arms 127 pivoted at 129 and has adjustable screws 133 in projections 132 thereof to be engaged by the adjacent portion 165 of a cam operable lever 162 whereby the feed roll 125 may be moved away from the feed roll 115 during the operation of the machine, to allow movement of the shelf 401 to pull varied lengths of the strip S relative to the cutting unit before operation of the unit, and also further movement of the shelf to deliver the cut lengths to the mandrel.

One of the features of the invention includes the delivery shelf mechanism. The shelf 401, supported on the arms 227, is apertured near its ends to receive rods 402 which support a clamping element 403 at their upper end. The clamping element extends transversely of the path of the strip of material S, when fed on to the shelf 401, and is longitudinally grooved at 404 to receive a tubular gripping member 405 formed of suitable material such as soft rubber to firmly hold the strip throughout its width against possible movement on the shelf. Springs 406 disposed concentric with the rods 402 normally urge the rods with the element 403 and member 405 downwardly with sufficient force to hold the member 405 against the strip to assure its maintenance on the shelf. The lower ends of the rods 402 carry projections 408 slidable longitudinally in apertures 409 in their respective guides 410 and when the shelf is in the receiving position shown in Fig. 1, and the rods are free to move downwardly under the force of the springs 406, cams 411 are positioned far enough away from the projections 408 to allow closing of the clamping element. The cams 411 are eccentrically mounted on the shaft 229 supported by the forward ends of the arms 230. Threaded members 412 are adjustably supported by the lower ends of the cams 411 to vary the action on the clamping element 403. As the delivery shelf approaches the mandrel, the projections 408 of the rods 402 ride upon their cams 411 effecting opening of the clamping means in time to release the cut length of strip. Variations in the time when this takes place is accomplished by adjusting the threaded element relative to a plate 414 upon which it rides during the operation of the machine.

Figure 3:
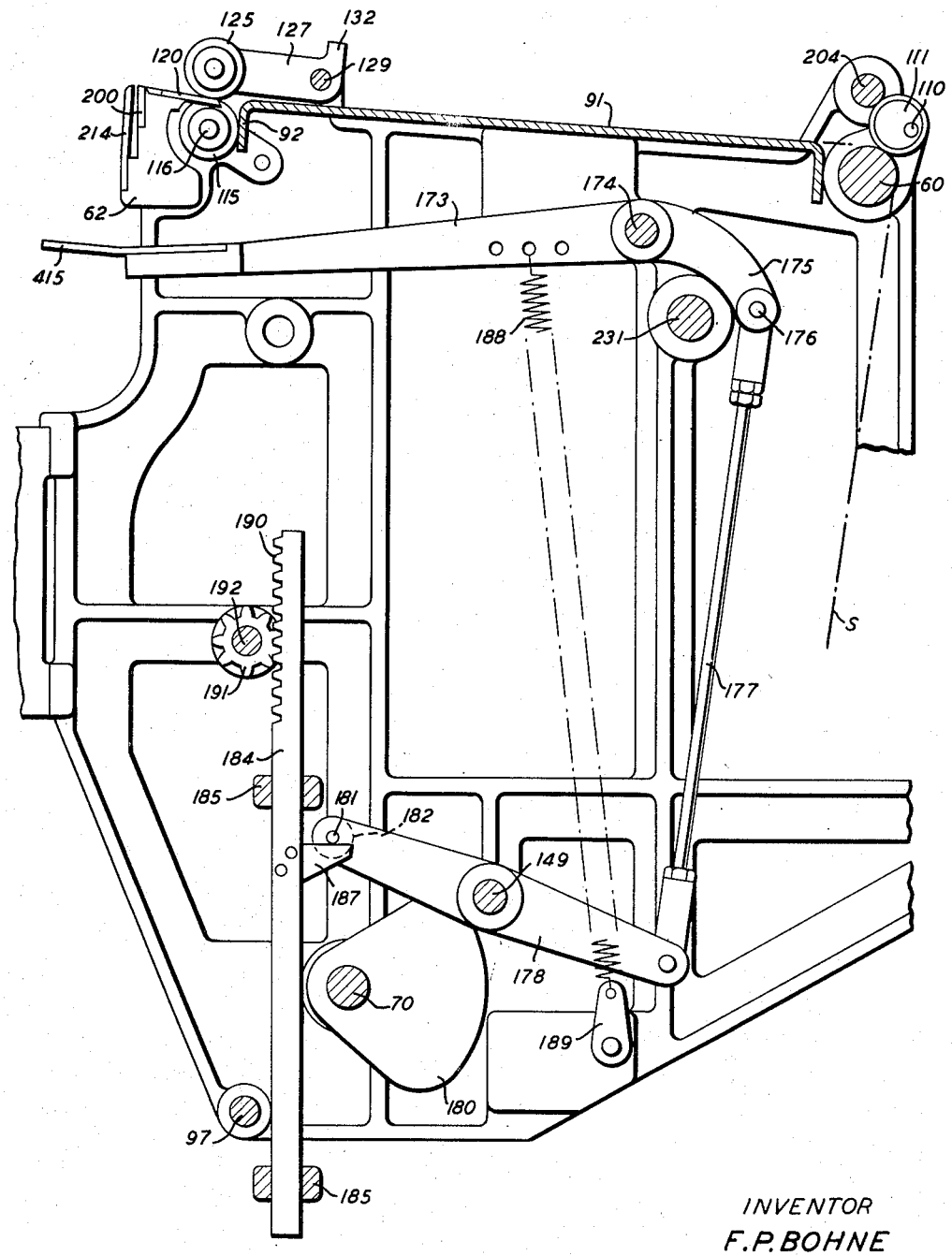
Fig. 3 is another vertical sectional view of the machine, illustrating the elevating means.

In the structure of the machine, the arms 173 (Figs. 1 and 3) pivotally supported at 174, which originally supported the measuring bar of the initial machine, are utilized to support lifting fingers 415 in place of the measuring bar. The fingers extend beneath a horizontal bar 416 adjustably secured to the vertical bars 402 to act as the opening means for the clamping element 403 while the shelf 401 is in its receiving position shown in Fig. 1. The arms 173 as shown in Fig. 3 have arcuate portions 175 pivotally connected at 176 to the upper end of a link 177, the lower end of which is connected to the adjacent end of a lever 178. The lever 178 is pivoted at 149, the opposite end of the lever carrying a pin 181 at one side thereof and a cam roller 182 at the opposite side thereof. The pin 181 is positioned to engage a shelf 187 of a vertically movable rack 184 under the control of a mechanism (not shown) to intermittently rotate pinion 191 counterclockwise. Through this mechanism the intermittent rotation of the pinion moves the shelf 187 upwardly as the material, namely the layers of wires and the lengths of insulating material, build up on the mandrel. The cam roller 182 is engaged at time intervals by the high portion of the cam 180, driven with the shaft 170, to rock the lever 178 clockwise against the force of the spring 188 to rock the arms 173 clockwise. The arms 173, during their clockwise rocking movements will engage the bar 416 when the shelf 401 is in the receiving position and force the clamping element 403 into its open position where it will be held until the leading end of the strip is fed onto the shelf. When this has been accomplished the cam 180 frees the lever 178 allowing the spring 188 to rock the arms 173 counterclockwise and free the clamping element 403 to clamp the leading end of the strip.

Figure 4:
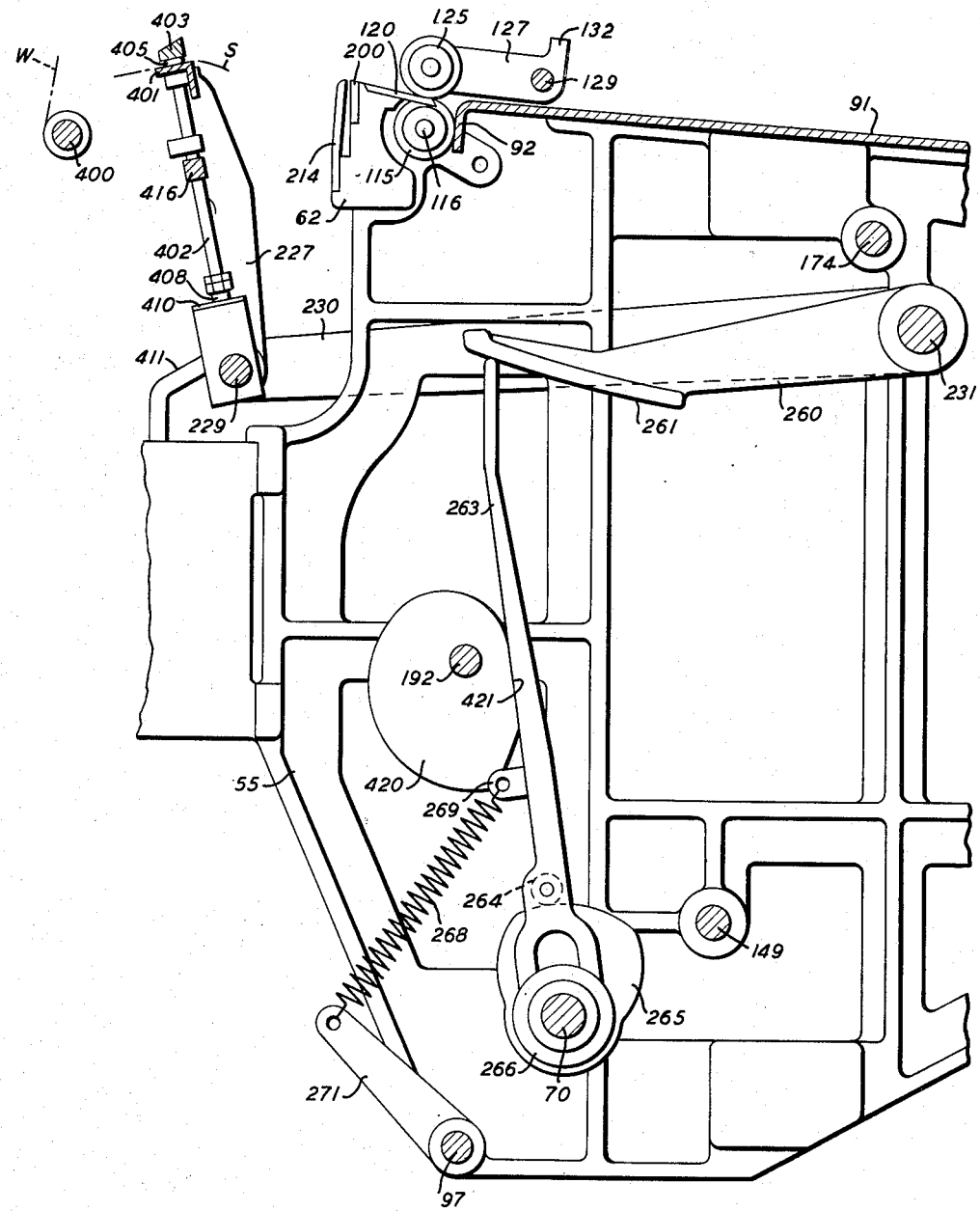
Fig. 4 is another vertical sectional view of the machine including the elevating means and showing the delivery shelf advancing toward the mandrel.

Attention is now directed to Fig. 4 which discloses the mechanism for elevating the delivery shelf as the material on the mandrel builds up, to assure accurate feeding of the successive lengths of insulating material to the mandrel. The arms 230 supporting the delivery shelf mechanism are fixedly mounted on a shaft 231 which also has an elevation arm 260 fixedly mounted thereon intermediate the arms 230. A lifting member 263 has its upper end positioned to engage the cam surface 261 of the elevation arm 260, the lower end of the lifting member being forked to straddle the shaft 70 for reciprocable movement under the control of the cam roller 264 and cam 265. The roller 264 is mounted on the member 263 and is normally urged toward the shaft 70 by the spring 268. However, during rotation of the cam 265 one revolution during each cycle of the machine, the delivery shelf will be moved from its lowermost or receiving position, shown in Fig. 1, to its elevated position shown in Figs. 4 and 5. A cam 420, which is a modification of the initial cam, is mounted on the shaft 192 with the sprocket 191 (Fig. 3) to turn a fraction of a revolution during each cycle of the machine to move from the starting position, shown in Fig. 4 where the flat surface 421 engages the member 263, to gradually move the lifting member 263 clockwise relative to the cam surface 261 thereby elevating the delivery shelf to a higher level during building up of the material on the mandrel, particularly during the advancement of the delivery shelf to the feeding position.

Figure 2:
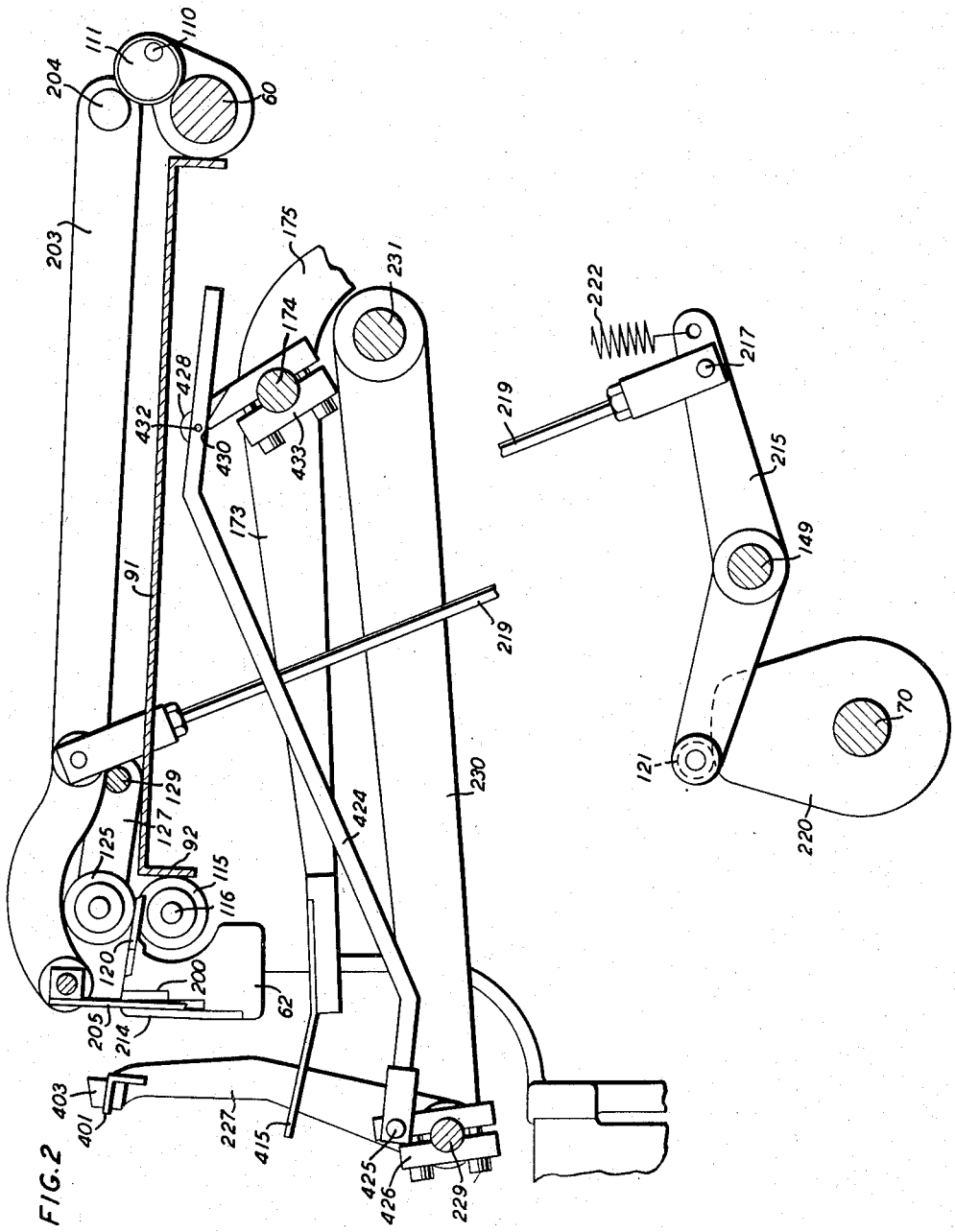
Fig. 2 is a vertical sectional view of the machine illustrating the measuring mechanism about to be operated subsequent to the shearing of the paper.
Figure 6:
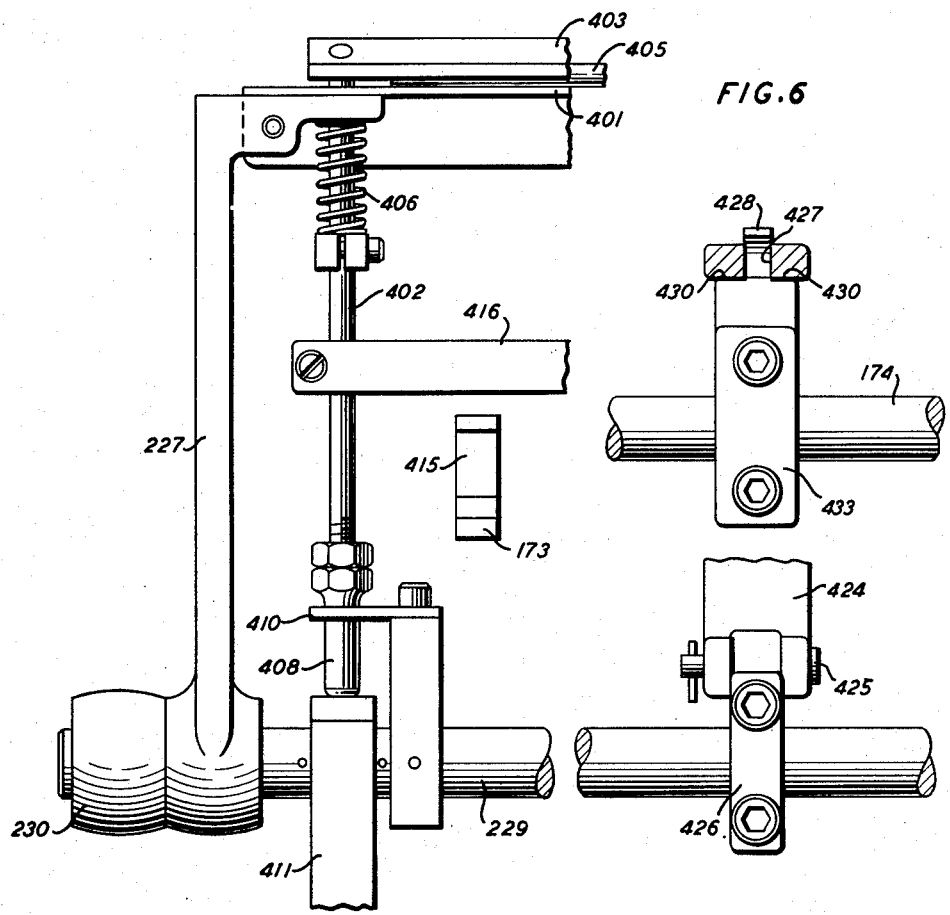
Fig. 6 is a fragmentary detailed view of the mechanism illustrating the major portion of the invention.
Figure 7:
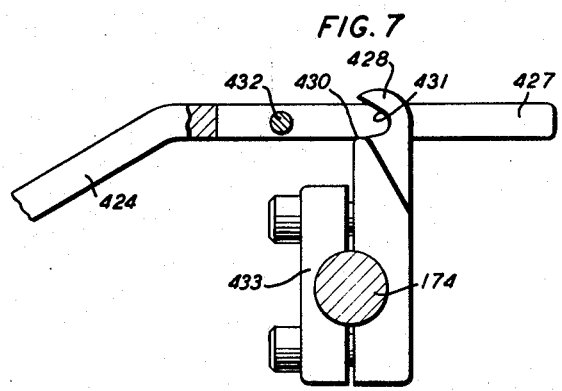
Fig. 7 is a fragmentary detailed sectional view of a portion of the measuring means for the delivery shelf to control the length cut from the strip.

One of the important features of the invention includes the mechanism operatively connecting the arms 173, particularly the shaft 174 supporting the arms with the shaft 229 supporting the delivery shelf mechanism, whereby the delivery shelf may function also as a measuring means for the mandrel. This mechanism is shown in Figs. 2, 6 and 7 and includes a rocking element or link 424 having its forward end pivoted at 425 to a clamp 426 whereby the axis of the pivot 425 will be eccentric with respect to the axis of the shaft 229. The opposite end of the element 424 is forked at 427, as shown in Figs. 6 and 7, to receive a hook-like actuating member 428. The member 428 has shoulder-like portions 430 to support the end 427 of the element 424 and to cause the cutaway portion or recess 431 to register with a pin 432 completing a positive connection between the element 424 and the member. The member 428 is rigidly clamped as indicated at 433 onto the arms 174 which is rocked by the cam 180 (Fig. 3) during rocking movement of the arms 173.

Figure 5:
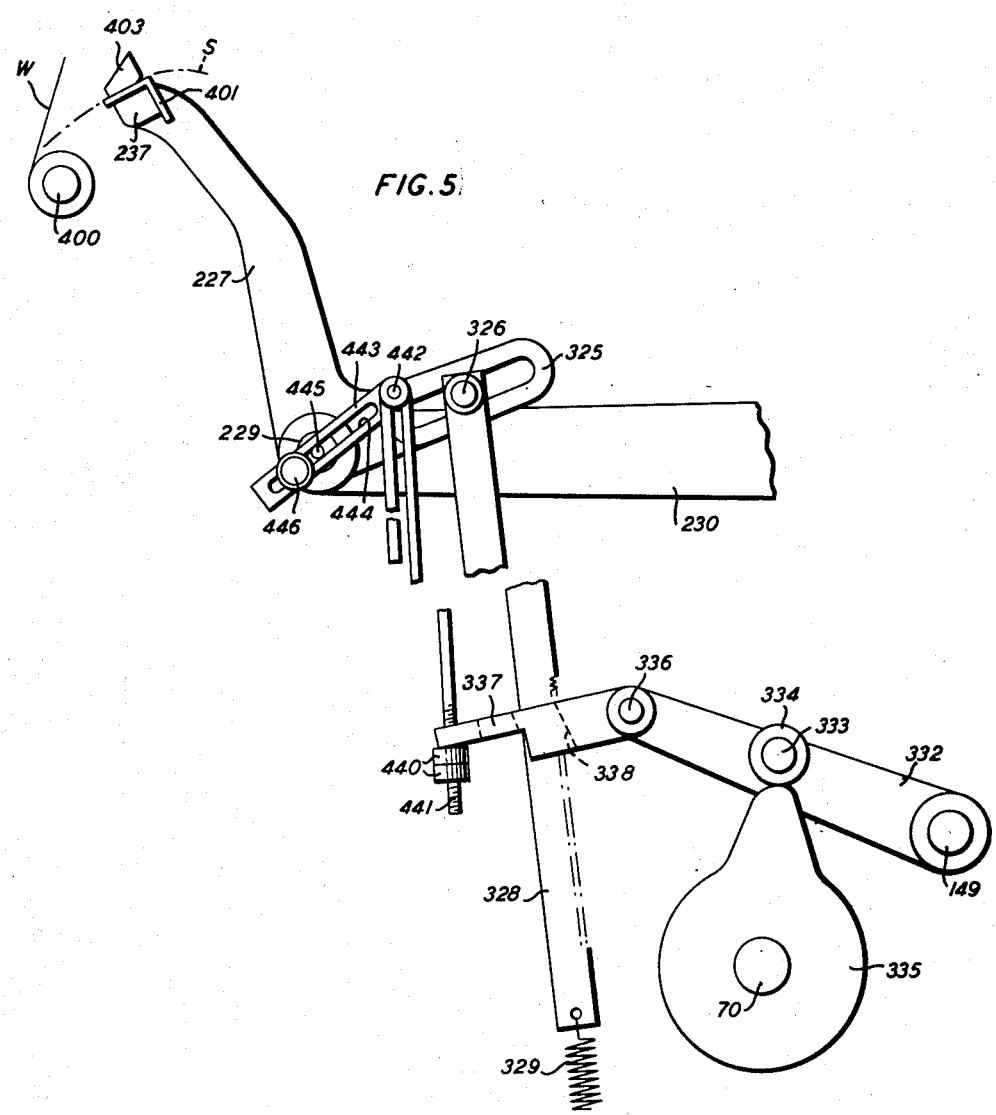
Fig. 5 is a fragmentary vertical sectional view illustrating the operating mechanism for the delivery shelf.

It has been found that through the structure shown particularly in Fig. 7, the time between the movement of the recess of the member 422 into engagement with the pin 432 will allow the arms 173 with their fingers 415 to move downwardly or counterclockwise to free the clamping bar 403, allowing its springs to force the gripping member 405 to firmly clamp the leading end of the strip on the delivery shelf before the delivery shelf is moved out of its receiving position. The further movement of the arms 173 during rocking of the shaft 174 causes movement of the element 424 to rock the shaft 229 and thereby move the delivery shelf mechanism counterclockwise away from the cutting unit to pull a given length of the strip relative to the unit. This constitutes the initial measured advancement of each length of insulating material. As soon as this is accomplished the movable shearing blade 205, supported by the arms 203 on their pivot 204 is moved downwardly by the cam 220 on the cam shaft 70 rocking the lever 215 and causing the pull rod 219 to pull the arms 203 with the blade 205 downwardly against the force of the spring 222. The blade 205, cooperating with the stationary blade 200, shears the measured length of material from the strip S. The additional moving mechanism for the delivery shelf 400 is shown in Fig. 5 and with one exception this mechanism is similar to the elevator mechanism disclosed in the Le Boeuf patent. The delivery shelf mechanism supported by the arms 230 may be rocked with the shaft 229 through the operation of the cam 335. One of the levers 227 has the ratchet-like bar 328 connected at 326 thereto which is normally urged downwardly by the spring 329. The cam 335 has a single high portion to engage the cam roller 334 supported at 333 on the lever 332 which is pivoted at one end at 149, the other end pivotally supporting the dog 337 at 336. The dog 337 has a diagonally extending aperture 338 to receive the bar 328 while the upper edge of the aperture is to cooperate with the teeth on the bar to form positive connection with the lever 332. Through this mechanism, regardless of the position of the delivery shelf during the measuring of successive lengths from the strip, the delivery shelf will complete its movement to the feeding position shown in Fig. 5 at which time the projections 408 (Fig. 1) will have moved onto the cams 411 the required distances to cause opening of the clamping element 403—405.

In the aforementioned patent, a stationary stop was provided to be engaged by the dog 337 to release it from the bar 328. Owing to the fact that in the present embodiment of the invention the delivery shelf is utilized not only as a means of delivering the lengths of material to the mandrel, but also as a means to measure these lengths before they are severed from the strip, a movable release 440 is provided for the dog 337 in the form of threaded elements or nuts mounted on a threaded member 441 secured at 442 to an adjustable member 443 having a longitudinal aperture 444 to receive a pin 445, mounted at the axis of the shaft 229 and coincident therewith, and to also receive a locking screw 446 supported by the adjacent lever 227. The screw 446 and the pin 445 maintain the element 443 at a given angle with respect to a plane extending through the axis of the shaft and the pivot 326 for the bar 328. Furthermore, the outer end of the dog 337 is bifurcated to rest upon the members 440 so that when the high portion of the cam 335 passes beyond the roller 334, the dog 337 will be released from the bar allowing the spring 329 to move the bar downwardly and to rock the delivery shelf into its receiving position adjacent the shearing unit.

During operation of the apparatus embodying the invention, the strip of materials will be advanced intermittently by the feed rolls 115 and 125 to successively move the leading end of the strip a given distance onto the delivery shelf 401, which is in engagement with the cutting unit closely adjacent the line where the material is to be cut. During this interval of time, the clamping element 403—405 is open, but as soon as the material is fed onto the shelf the arms 173 will be rocked counterclockwise to first close the clamping element causing the resilient member 405 to firmly grip the strip throughout its width. Continued movement of the mechanism shown in Figs. 1, 2 and 3 to rock the arms 173 and to particularly rock the shaft 174 will cause the mechanism incorporated in Figs. 2, 6 and 7 to move the element 424 to the left, rocking the shaft 229 with the delivery shelf mechanism a given distance to pull the strip of insulating material a measured distance from the cutting unit. The cutting mechanism shown in Fig. 2 is then operated to shear the measured length from the strip after which the mechanism shown in Fig. 5 is operated to continue or complete the movement of the delivery shelf 400 to the feeding position to feed the strip to the mandrel at the moment the distributing mechanism reverses its movement to begin a new layer of convolution of the wires on the mandrel. Just prior to the delivery shelf reaching the feeding position, the cams 411, shown in Figs. 1 and 6, have moved the bars 402 vertically against the force of their springs 406 moving the clamping element 403 upwardly to free the length of material so that it may be pulled into the winding on the mandrel.

It is to be understood that the above described arrangements are simply illustrative of the application of the principles of the invention. Numerous other arrangements may be readily devised by those skilled in the art which will

What is claimed is:

1. In a machine for winding electrical coils having means to rotate a mandrel on which layers of convolutions of a conductor are wound and lengths of insulating material are to be cut by an intermittently operable cutting unit from a strip of the material advanced given distances at successive intervals relative to the cutting unit, a delivery shelf supported for movement from a receiving position, closely adjacent the cutting unit to a feeding position adjacent the mandrel, a clamping element extending transversely of the strip to engage the strip for the full width thereof, resilient means normally urging the clamping element toward the delivery shelf to cause the element to firmly hold the leading end of the strip against displacement on the delivery shelf, a mechanism operable to move the clamping element away from the shelf when in its receiving position and hold the element in this position until the leading end of the strip is fed to the delivery shelf, after which the said mechanism is operated to free the resilient means to close the clamping element on the strip, means operable to move the delivery shelf a known distance from the cutting unit to pull a given length of the strip beyond the cutting unit prior to the operation of the cutting unit, means to continue movement of the delivery shelf to the feeding position to feed the length of material to the mandrel, and a cam to cause movement of the clamping element free of the length of material as the delivery shelf approaches the feeding position.

2. In a machine for winding electrical coils having means to rotate a mandrel on which layers of convolutions of a conductor are wound and lengths of insulating material are to be cut by an intermittently operable cutting unit from a strip of the material advanced given distances at successive intervals relative to the cutting unit, a delivery shelf supported for movement from a receiving position, closely adjacent the cutting unit to a feeding position adjacent the mandrel, a clamping element extending transversely of the strip to engage the strip for the full width thereof, resilient means normally urging the clamping element toward the delivery shelf to cause the element to firmly hold the leading end of the strip against displacement on the delivery shelf, a mechanism operable to move the clamping element away from the shelf when in its receiving position and hold the element in this position until the leading end of the strip is fed to the delivery shelf, after which the said mechanism is operated to free the resilient means to close the clamping element on the strip, means operable to move the delivery shelf a known distance from the cutting unit to pull a given length of the strip beyond the cutting unit prior to the operation of the cutting unit, means to continue movement of the delivery shelf to the feeding position to feed the length of material to the mandrel, means to elevate the delivery shelf at given intervals to elevate the feeding position as the windings build up on the mandrel, and a cam elevated with the delivery shelf to cause movement of the clamping element free of the length of material as the shelf approaches its feeding positions.

3. In a machine for winding electrical coils having means to rotate a mandrel on which layers of convolutions of a conductor are wound and lengths of insulating material are to be cut by an intermittently operable cutting unit from a strip of the material advanced given distances at successive intervals relative to the cutting unit, a delivery shelf supported for movement from a receiving position, closely adjacent the cutting unit to a feeding position adjacent the mandrel, means movable with the delivery shelf to grip the leading end of the strip, a bar normally urged in one direction to move the delivery shelf into its receiving position, a push rod operatively connected to the delivery shelf, a mechanism operable to move the push rod varied distances to move the delivery shelf like varied distances from the cutting unit to cause it to pull varied lengths of the strip beyond the cutting unit, a dog actuable to engage the bar to complete movement of the delivery shelf to its feeding position, and means to hold the dog ineffective to move the bar until subsequent to the cutting of the strip by the cutting unit.

FREDERICK P. BOHNE.

References Cited in the file of this patent

UNITED STATES PATENTS

| Number | Name | Date |
| --- | --- | --- |
| 1,966,494 | Franks | July 17, 1934 |
| 2,029,577 | Le Boeuf | Feb. 4, 1936 |
| 2,030,989 | Hofstetter | Feb. 16, 1936 |
| 2,542,303 | Bosh et al. | Feb. 20, 1951 |